F. R. Van Dake,
Fruit Crate.
No. 95,169.                               Patented Sep. 21, 1869.
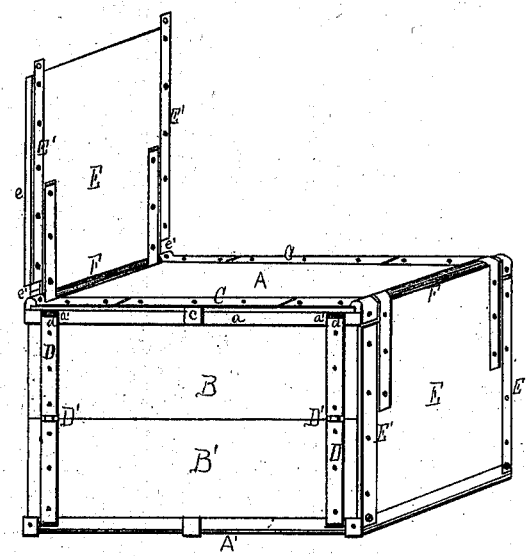
Fig: 1.
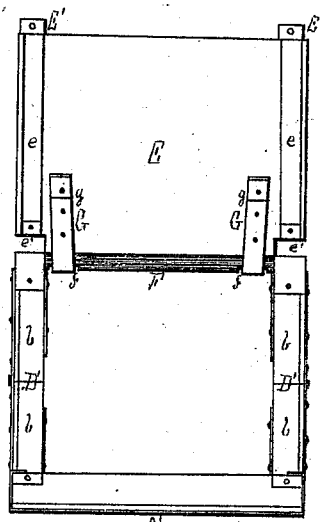
Fig: 2.
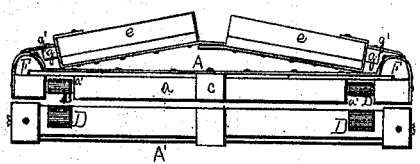
Fig: 3.
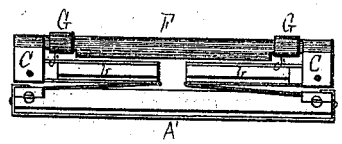
Fig: 4.
WITNESSES.
Edwin James
A. Holmead Jr
INVENTOR.
Frank R. Van Dake.
per J. E. T. Holmead
Attorney.

United States Patent Office.

FRANK R. VAN DAKE, OF JACKSON, MISSISSIPPI.

Letters Patent No. 95,169, dated September 21, 1869.

---

IMPROVEMENT IN FRUIT-CRATES.

---

The Schedule referred to in these Letters Patent and making part of the same.

---

*To all whom it may concern:*

Be it known that I, FRANK R. VAN DAKE, of Jackson, in the county of Hinds, and State of Mississippi, have invented certain new and useful Improvements in Folding-Boxes or Crates; and I do hereby declare that the following is a full, clear, and exact description of the same, reference being had to the accompanying drawing, and to the letters of reference marked thereon, making part of this specification, in which—

Figure 1 is a side view of the box or crate, one of the end pieces being in position, and the other elevated.

Figure 2 is an end view of the box open.

Figures 3 and 4 are side and end views of the box or crate folded.

The object of my present invention is to construct a fruit-box or crate, for the reception and transportation of merchandise, produce, fruit, live stock, vegetables, poultry, &c., that is cheap and durable, its parts being so arranged, that when the same has been emptied, and the end pieces thrown out, they may be folded, upon one another, in compact form, for transportation.

I am aware that boxes and crates have heretofore been used embracing the same principle as mine—e. g., Martin's English patent of 1855, No. 2,174; but I am not aware that a box or crate has ever been constructed on a principle similar to mine that can possibly be folded with the same compactness; and, as the compactness with which the box is allowed to fold, for re-transportation or storage, not only constitutes the chief, but, indeed, the only value of having a box or crate so connected, the superiority of my plan over Martin's, and all others, will be apparent. Martin's box, for instance, cannot possibly be folded so as to be reduced to less than six thicknesses of the material, while by my arrangement, owing to the fact that the sides fold in between the flanges of the top and bottom, and the end pieces or gates meeting, so as to form one continuous piece, it is reduced, when folded, to only three thicknesses. This I accomplish, and in this my invention consists, by providing the top and bottom with cleats or strips, to which the side pieces are connected, the same being done by loops formed in the brace-bands, whereby hinged joints are formed. The end pieces or gates are secured, in like manner, by loops, so that they are made to swing in either direction, readily folding over on the top of the box, where they meet, and form, as it were, one continuous piece.

It will be seen that a box constructed in accordance with my plan will cost but little more than the ordinary "dry-goods box," as I use the same style of brace-bands, and the hinges are provided by loops formed therein. A centre partition, running in either direction, may be introduced, should the same be deemed desirable.

To enable others skilled in the art to make and use my invention, I will now proceed to describe its construction and operation.

The box may be made of wood, or any other suitable material, and of any desired form and size. It may be so constructed as to be perfectly air and water-tight, or in such manner as to admit of the most thorough ventilation. The box shown in the drawing is a close one, and its form is the ordinary oblong or rectangular trunk or crate-shape.

The top A and bottom A' are each constructed in one piece.

The sides are constructed in two sections, B B', the width of each being the same and a little less than one-half the desired height of the box or crate.

On the inner surfaces of the top and bottom pieces A A', and along each side edge thereof, is firmly secured, by the metallic bands C C, and a short brace-band, $c$, a wooden strip or cleat, $a$.

These cleats $a$ $a$ may be of any desired form, care being taken that they shall be slightly rounded on their inner surfaces, so as to allow of the free movement of the side pieces B B'.

These strips or cleats $a$ $a$ are recessed at $a'$ $a'$, so as to allow a proper bearing for the loop-ends of the metallic bands D D.

These bands D D are united by a hinged joint, at D', and are of such length as to nearly encircle the entire side pieces B B', each having a loop, at $d$, which works freely around the recessed portion $a'$ of the strip or cleat $a$, and also securing, on the inner surface, and near the outer end of each of the side pieces, a wooden strip or cleat, $b$.

These strips $b$ $b$ extend nearly the entire width of the pieces B B', and form, when the side is extended, as it were, one continuous piece, near each edge of the interior of the opening of the box.

These strips $b$ $b$ form a bearing-surface, against which rest similar strips or cleats, $e$ $e$, attached to the end pieces E E, and by means of which the box is firmly and securely braced when opened.

The end pieces E E and the strips $e$ $e$ are firmly secured together by means of the metallic bands E' E'.

These end pieces, or gates E E, as they might properly be termed, consist, each, of one piece, their length being the height of the side pieces B B' united, and their width exactly such as to cover the end of said side pieces when they are extended.

At the sides of the gates E E, a portion of their upper surface is cut away, as seen at $e'$ $e'$, to allow of their free passage around the ends of the strips $a$ $a$ of the top piece A.

F is a circular bar, which is firmly secured, at each end of the box or crate, and to the top piece A and strips or cleats $a$ $a$, by means of the bands C C.

Around recesses $f$ $f$, cut in this bar F, pass the looped ends of short bands G G, which are secured to the outer surface of the gate E, and to the bearing-blocks g g, on the inner surface, by means of short nails g' g', or any other convenient means.

The operation of the box or crate is as follows:

In its folded condition, it is clearly shown in figs. 3 and 4. To open the box, you simply have to elevate the top A, and turn down one of the end pieces E, when the strips e e, entering between the sides of the box, and resting against the strips b b, will firmly secure and brace the box in the position shown in figs. 1 and 2. The box is then in condition to be filled, after which operation is completed, the remaining gate is then turned down, and, by means of the straps E' E', firmly secured by lock, screw, seal, or other fastening.

Having thus fully described my invention,

What I claim therein as new, and desire to secure by Letters Patent of the United States, is—

The top A and bottom A', each having cleats a a, side pieces B B', and end pieces E E, when the same are so connected together, by loops formed in the brace-bands, that hinged joints are provided, whereby the box can be compactly folded in three layers, the sides falling in between the cleats of the top and bottom, and the end pieces folding over, and meeting on either the top or bottom, substantially as described.

In testimony whereof, I have signed my name to this specification, in the presence of two subscribing witnesses.

FRANK R. VAN DAKE.

Witnesses:
JAMES PRIESTLY,
J. B. LINDSEY.